United States Patent
Chang et al.

(10) Patent No.: US 8,279,337 B2
(45) Date of Patent: Oct. 2, 2012

(54) CASING OF WEBCAM

(75) Inventors: Ching-Huei Chang, Zhonghe (TW);
Ko-Hsien Lee, Dayuan Township (TW);
Ching-Feng Hsieh, Taipei (TW)

(73) Assignee: Askey Computer Corp. (TW)

( * ) Notice: Subject to any disclaimer, the term of this patent is extended or adjusted under 35 U.S.C. 154(b) by 83 days.

(21) Appl. No.: 12/828,799

(22) Filed: Jul. 1, 2010

(65) Prior Publication Data

US 2011/0285900 A1    Nov. 24, 2011

(30) Foreign Application Priority Data

May 21, 2010  (TW) .............................. 99209631 U (51) Int. Cl.
*H04N 5/225* (2006.01)
(52) U.S. Cl. .................. 348/374; 348/373; 348/375
(58) Field of Classification Search .......... 348/373–374, 348/81
See application file for complete search history.

(56) References Cited

U.S. PATENT DOCUMENTS

| | | | |
|---|---|---|---|
| 7,392,072 B2 * | 6/2008 | Im .............................. | 455/575.3 |
| 7,483,075 B2 * | 1/2009 | Kobayashi ................... | 348/374 |
| 7,782,559 B2 * | 8/2010 | Huang et al. .................. | 359/824 |
| 7,787,044 B2 * | 8/2010 | Chang ........................... | 348/357 |
| 7,845,867 B2 * | 12/2010 | Huang et al. ................. | 396/529 |
| 7,855,728 B2 * | 12/2010 | Aoki et al. .................... | 348/143 |
| 7,920,336 B2 * | 4/2011 | Murakami .................... | 359/704 |
| 2009/0086101 A1 * | 4/2009 | Lee .............................. | 348/655 |
| 2009/0219433 A1 * | 9/2009 | Higuchi ....................... | 348/340 |
| 2010/0074607 A1 * | 3/2010 | Topliss et al. ................ | 396/133 |
| 2010/0271541 A1 * | 10/2010 | Chou ............................ | 348/374 |

* cited by examiner

*Primary Examiner* — Kelly L Jerabek
*Assistant Examiner* — Pritham Prabhakher
(74) *Attorney, Agent, or Firm* — Schmeiser, Olsen & Watts, LLP (57) ABSTRACT

A casing of a webcam improves the hand feel of turning a lens ring. A base of the casing includes a sheath hole having a first connection portion, a first ring-shaped flange formed around an upper side of the lens ring, a second connection portion formed between upper and lower sides of the lens ring, and a second ring-shaped flange formed around the lens ring and abutted against an upper side of the sheath hole and a lower side of the first connection portion, and the first and second ring-shaped flanges of the lens ring are separated from the sheath hole by an interval. A flexible ring is clamped between the first and second connection portions and disposed between the first and second ring-shaped flanges, such that the casing can have a greater manufacturing tolerance to reduce manufacturing costs, and provide a better hand feel of turning the lens ring.

11 Claims, 7 Drawing Sheets

CASING OF WEBCAM

CROSS-REFERENCE TO RELATED APPLICATION

This non-provisional application claims priority under 35 U.S.C. §119(a) on Patent Application No(s).099209631 filed in Taiwan, R.O.C. on May 21, 2010, the entire contents of which are hereby incorporated by reference.

FIELD OF THE INVENTION

The present invention relates to a casing of a webcam, in particular to a casing capable of widening the tolerance to reduce manufacturing costs and providing a better hand feel to users when turning a lens ring.

BACKGROUND OF THE INVENTION

As present networks advance rapidly and information distributes quickly, most communication channels of information between people are primarily through the networks. Besides transmitting text information, the networks also can transmit audio information and video information through the rapidly growing network transmission bandwidth and speed, and thus webcam was introduced to the market.

Figure 1:
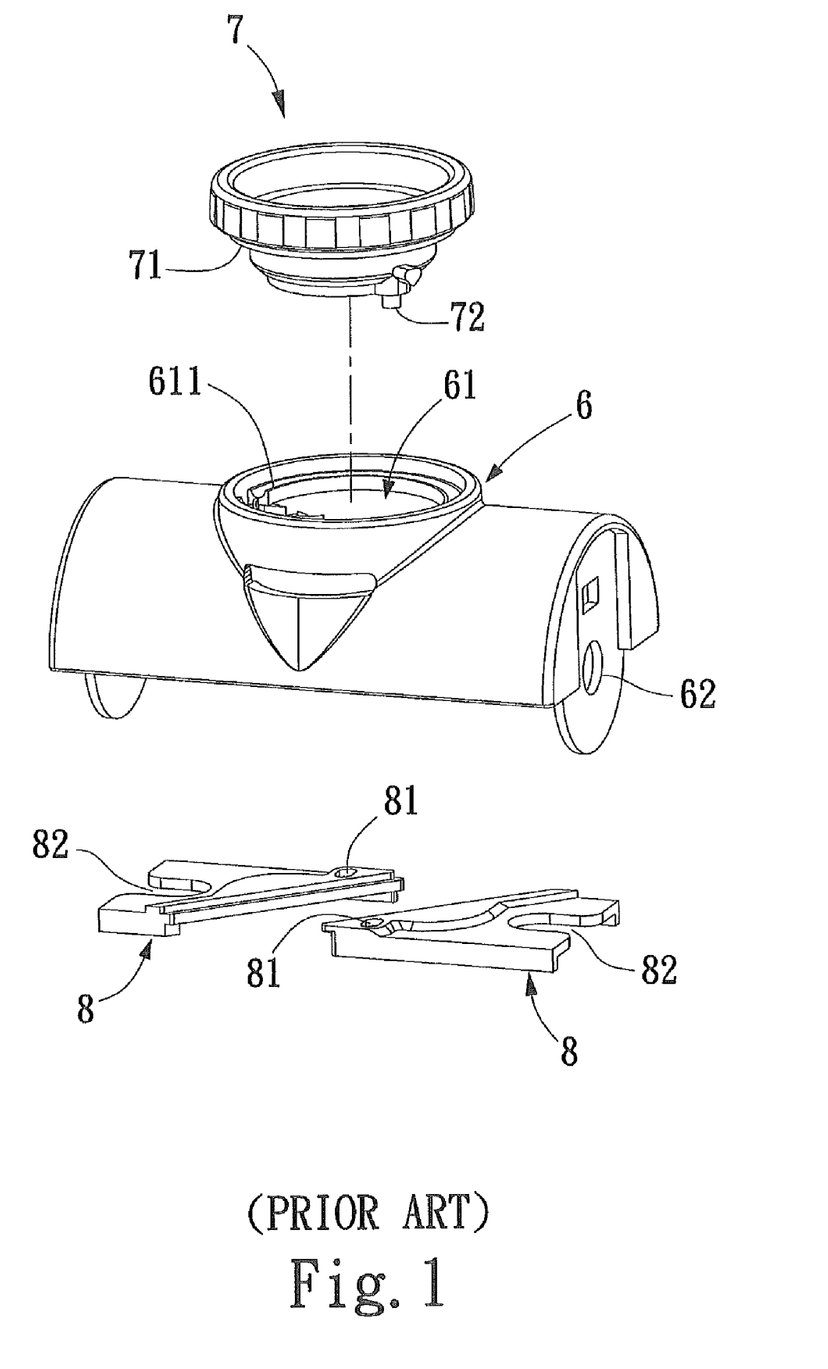
FIG. 1 is an exploded view of a conventional casing of a webcam.
Figure 2:
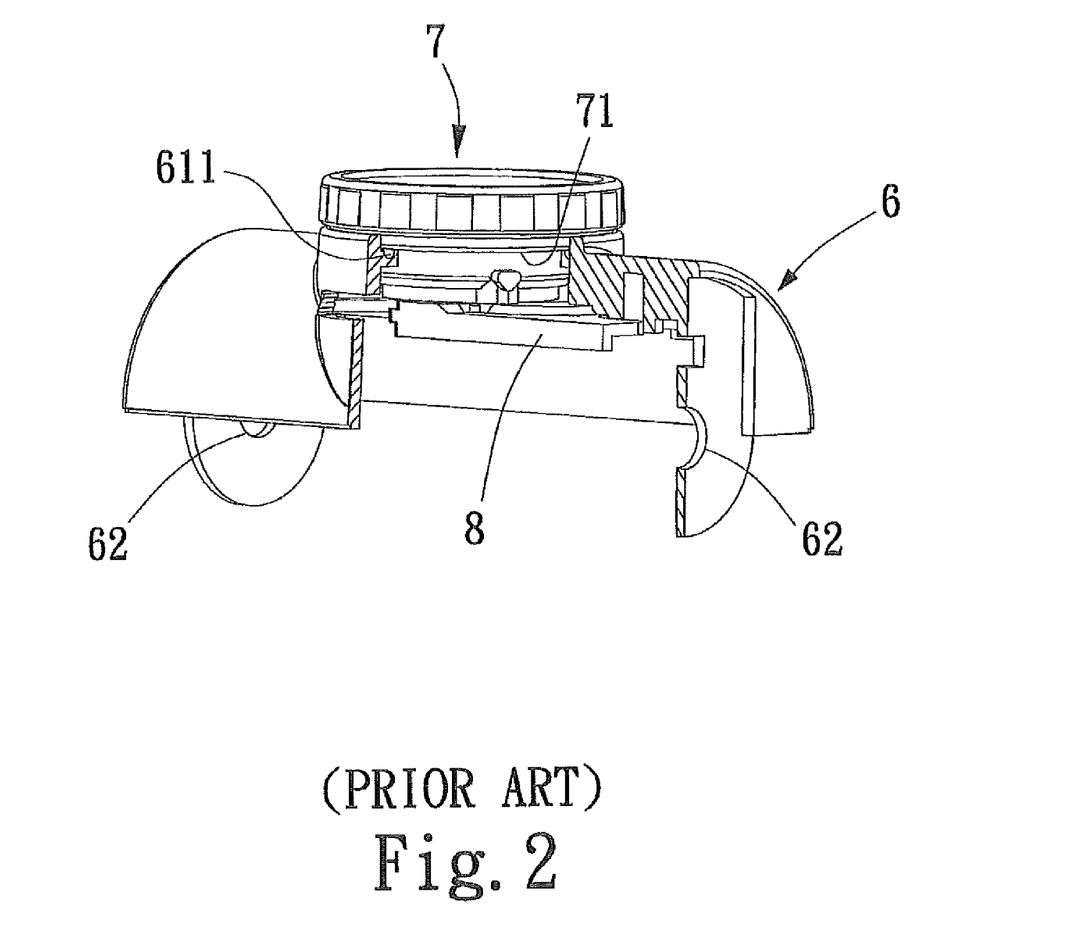
FIG. 2 is a cross-sectional view of an assembled portion of a conventional casing of a webcam.

With reference to FIGS. 1 and 2 for an exploded view and a perspective cross-sectional view of a conventional casing of a webcam respectively, the casing comprises a base 6, a lens ring 7 and two doors 8, wherein a shaft hole 62 is formed separately on both sides of the base 6 and a sheath hole 61 is formed between both sides of the base 6, and a ring slot 611 is formed in the sheath hole 61; and the lens ring 7 includes a ring-shaped flange 71, and the lens ring 7 includes a plurality of protruding pillars 72 disposed in a direction towards a side of the base 6, and the ring-shaped flange 71 is disposed in the ring slot 611 and provided for installing the lens ring 7 into the sheath hole 61 of the base 6; and the doors 8 include a penetrating hole 81 formed on a side of the doors 8, and a coupling slot 82 formed on another side of the doors 8, and the protruding pillars 72 are installed in the penetrating holes 81 respectively, such that the lens ring 7 can be turned to open or close the doors 8, so as to adjust the openness of the lens.

However, the lens ring 7 and base 6 of the conventional casing of a webcam are contacted and assembled directly by the ring-shaped flange 71 and ring slot 611, and they are structures in a rigid contact with each other, so that if a user turns the lens ring 7, the user will feel the rough and jerky hand feel, and the application will give an uncomfortable feeling to the user. If the ring-shaped flange 71 of the lens ring 7 and the ring slot 611 in the sheath hole 61 of the base 6 have an insufficient circularity, a rough edge or a deformation, then such uncomfortable hand feel will be more significant when the user turns the lens ring 7.

To turn the lens ring 7 with respect to the base 6 smoothly, the tolerance of the ring-shaped flange 71 of the lens ring 7 and the ring slot 611 of the base 6 must be controlled precisely. A too-small tolerance will tighten the connection between the lens ring 7 and the base 6 which is unfavorable to the turning, and makes the uncomfortable hand feel more significant when the user turns the lens ring 7. A too-large tolerance will loosen the connection between the lens ring 7 and the base 6, and thus the lens ring 7 cannot be fixed to a certain rotational angle. However, a precisely controlled tolerance will increase the manufacturing time and the manufacturing cost in the design and manufacture processes.

Therefore, it is a main subject for the invention to develop a casing of a webcam capable of widening the tolerance to reduce manufacturing costs and providing a better hand feel to users when turning a lens ring.

SUMMARY OF THE INVENTION

In view of the shortcomings of the conventional casing, it is a primary objective of the present invention to provide a casing of a webcam capable of widening the tolerance to reduce manufacturing cost.

Another objective of the present invention is to provide a casing of a webcam capable of providing a better hand feel to users when turning a lens ring.

To achieve the foregoing objectives, the present invention discloses a casing of a webcam, comprising: a base, having a sheath hole, and the sheath hole having a first connection portion; a lens ring, with an upper side disposed around a first ring-shaped flange, and having a second connection portion disposed between an upper side and a lower side of the lens ring, and around a second ring-shaped flange, and the first ring-shaped flange being abutted against of the upper side of the sheath hole, and the second ring-shaped flange being abutted against the lower side of the first connection portion, and a sheath hole being formed between the first ring-shaped flange and the second ring-shaped flange of the lens ring for isolating the first and second ring-shaped flanges; and a flexible ring, clamped between the first connection portion and the second connection portion, and disposed between the first ring-shaped flange and the second ring-shaped flange.

Therefore, the casing of a webcam of the present invention is capable of widening the tolerance to reduce manufacturing costs, and providing a better hand feel to users when turning a lens ring.

DESCRIPTION OF THE PREFERRED EMBODIMENTS

The objects, characteristics and effects of the present invention will become apparent with the detailed description of the preferred embodiments and the illustration of related drawings as follows.

Figure 3:
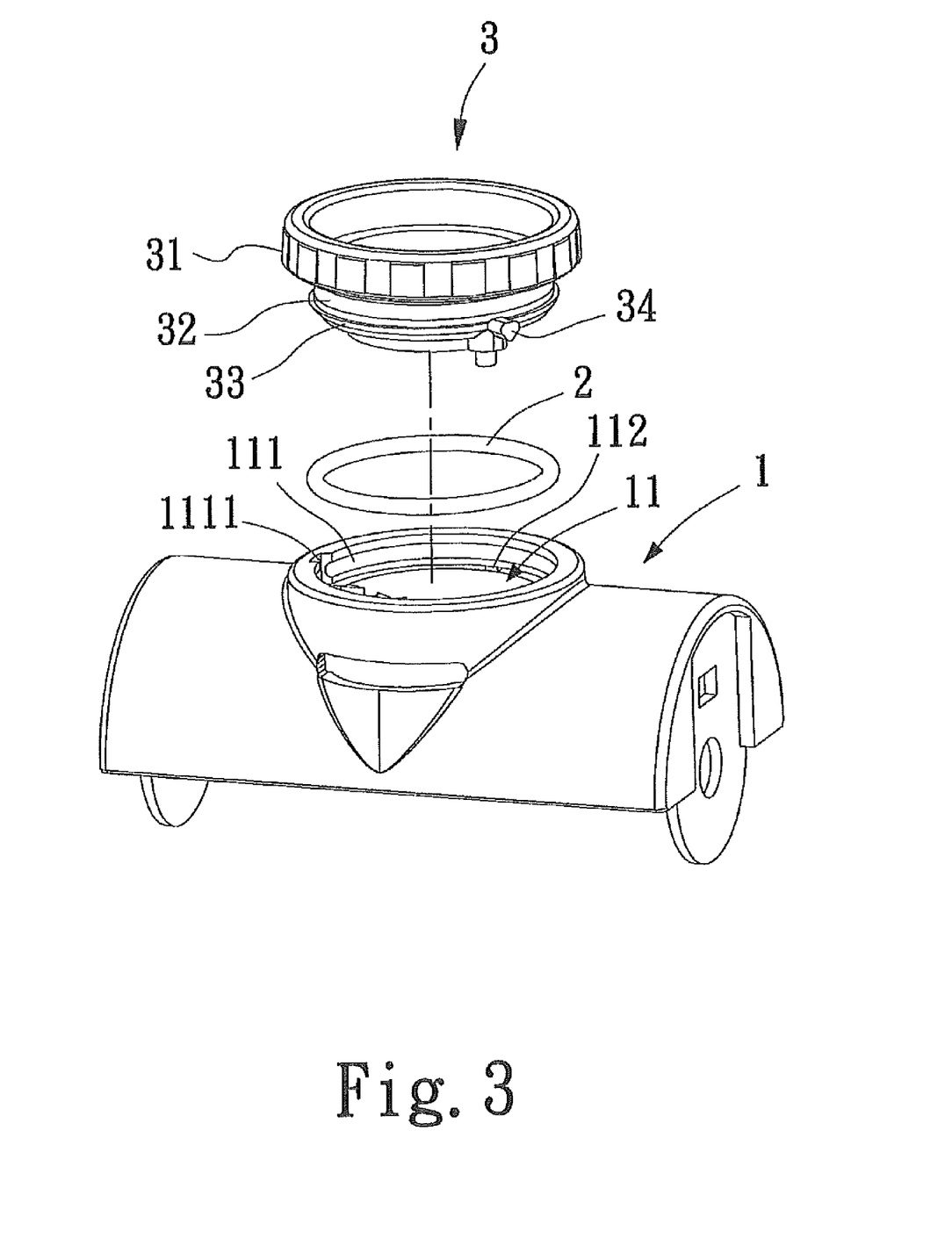
FIG. 3 is an exploded view of a preferred embodiment of the present invention.
Figure 4:
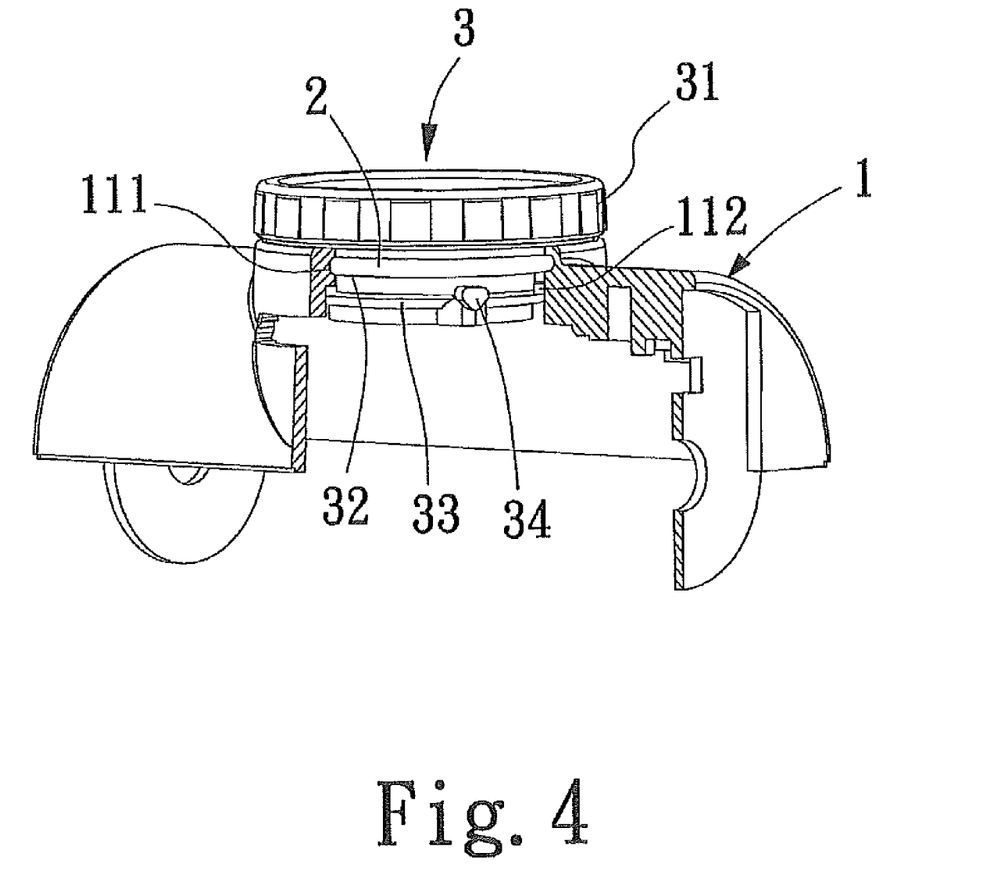
FIG. 4 is a cross-sectional view of an assembled portion of a preferred embodiment of the present invention.
Figure 5:
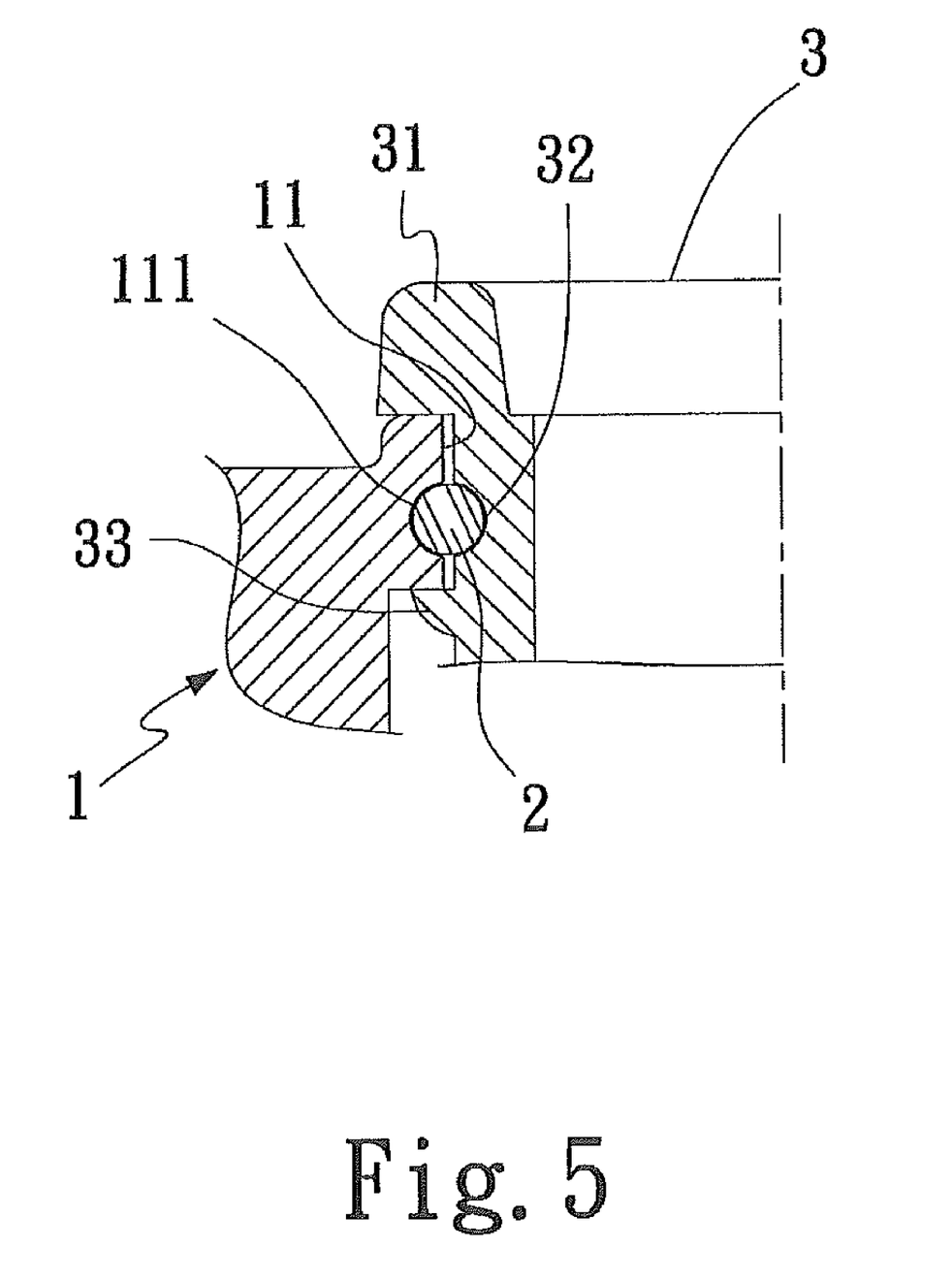
FIG. 5 is a cross-sectional view of an assembly of a preferred embodiment of the present invention.

With reference to FIGS. 3 to 5 for an exploded view, a partial cross-sectional view and a cross-sectional view of a preferred embodiment for the present invention respectively, a casing of a webcam of the present invention comprises a base 1, a flexible ring 2 and a lens ring 3, wherein the flexible ring 2 is made of rubber or any flexible material, and a sheath hole 11 is formed at the top of the base 1, and the sheath hole 11 has a first connection portion 111; a first ring-shaped flange 31 is disposed around an upper side of the lens ring 3, and a second connection portion 32 and a second ring-shaped flange 33 are formed from top to bottom between the upper side and the lower side, and the first ring-shaped flange 31 is abutted against an upper side of the sheath hole 11, and the second ring-shaped flange 33 is abutted against a lower side of the first connection portion 111, and the first ring-shaped flange 31 and the second ring-shaped flange 33 of the lens ring 3 are isolated by the sheath hole 11; and the flexible ring 2 is clamped between the first connection portion 111 and the second connection portion 32 and disposed between the first ring-shaped flange 31 and the second ring-shaped flange 33.

The first connection portion 111 can be a first ring slot, and the second connection portion 32 can be a second ring slot, such that a side of the flexible ring 2 is contained in the first connection portion 111, and another aide of the flexible ring 2 is contained in the second connection portion 321. In this preferred embodiment, the first connection portion 111 and the second connection portion 32 horizontally clamp the flexible ring 2, or vertically clamp the flexible ring 2. If a user touches the first ring-shaped flange 31 to rotate the lens ring 3, the first ring-shaped flange 31 will slide to touch the upper side of the sheath hole 11, and the second ring-shaped flange 33 slides to touch the lower side of the first connection portion 111, and the lens ring 3 is rotated with respect to the base 1 by the flexible ring 2.

The sheath hole 11 includes a passage 1111 passing though the first connection portion 111, and the sheath hole 11 disposed at the lower side of the first connection portion 111 includes a stop block 112, and the lens ring 3 includes a guide pillar 34 disposed around the periphery of the lens ring 3 and at the lower side of the first connection portion 111, and the passage 1111 is provided for passing the guide pillar 34 through the passage 1111, and the stop block 112 is provided for stopping and blocking the guide pillar 34. If a user turns the lens ring 3 to a specific angle, the stop block 112 will block the guide pillar 34 and limit the rotational angle of the lens ring 3.

Figure 6:
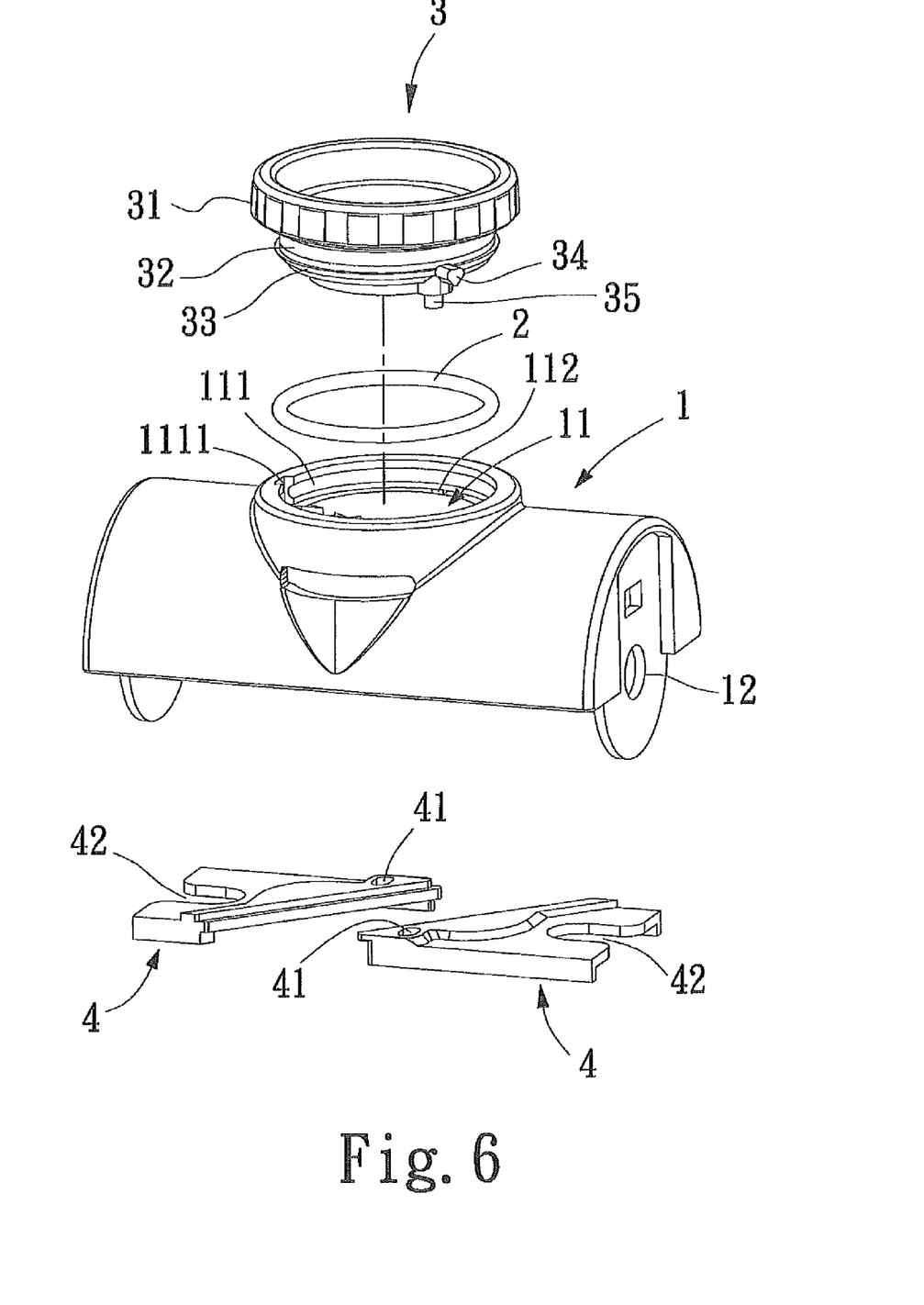
FIG. 6 is an exploded view of another preferred embodiment of the present invention.
Figure 7:
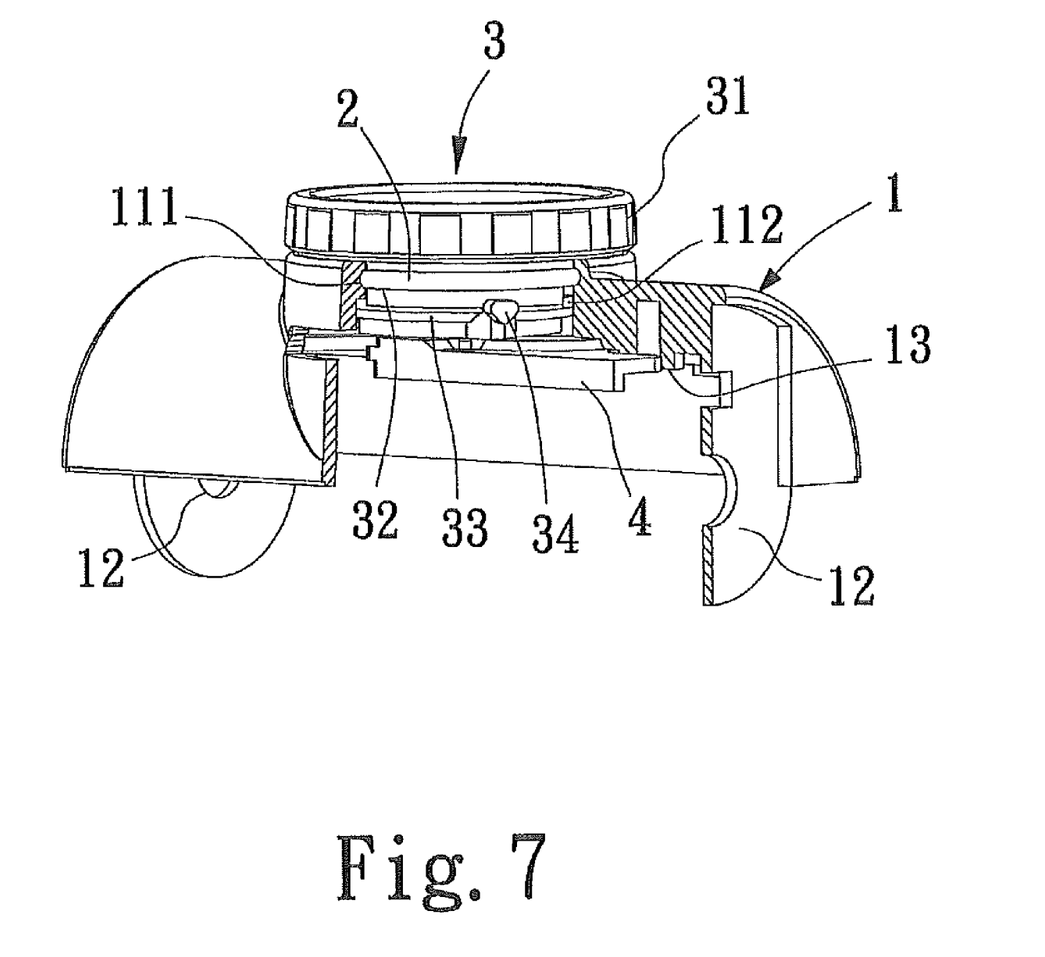
FIG. 7 is a cross-sectional view of an assembled portion of another preferred embodiment of the present invention.

With reference to FIGS. 6 and 7 for an exploded view and a partial cross-section view of an assembly of another preferred embodiment of the present invention, the casing of the webcam in accordance with the present invention further comprises a plurality of doors 4, such as two doors 4, and a penetrating hole 41 is formed on a side of each door 4, and a coupling slot 42 is formed on another side of each door 4, and a plurality of protruding pillars 35, such as two protruding pillars 35 (another protruding pillar of FIG. 6 is disposed at the lower side of the lens ring 3 which is opposite to the viewable protruding pillar 35), and the protruding pillars 35 are installed to the penetrating holes 41 respectively, and the coupling slots 42 are disposed against the flange 13 in the base 1. If a user wants to open the lens, the user can turn the lens ring 3 in a direction, such that the protruding pillars 32 installed in the penetrating holes 41 will drive the doors 4 to move horizontally and rotate, while of the coupling slots 42 of the doors 4 also will move horizontally and rotate along the flanges 13, so as to open the doors 4. If the user wants to close the lens, the user can turn the lens ring 3 in another direction to close and engage the doors 4 with each other.

The doors 4 can be closed with respect to each other if they are engaged with each other on a substantially oblique side.

A pivot portion 12 such as a pivot hole or a pivot shaft can be disposed separately on left and right sides of the base 1, and the base 1 can be installed by rotating the pivot portion 12 and other devices.

If a user turns the lens ring 3, the doors 4 can be opened or closed to adjust the openness of the lens and the lens ring 3 and the base 1 are assembled by the flexible ring 2, and the flexible ring 2 can keep a distal surface of the second connection portion 32 of the lens ring 3 away from being in contact with a distal surface of the first connection portion 111 of the base 1. When the user turns the lens ring 3, the flexible ring 2 can provide a flexible support, so that the user will have a better hand feel. In addition, the flexible ring 2 can have an appropriate deformation to absorb the tolerance of the lens ring 3 and the base 1 or absorb the size discrepancy of the lens ring 3 and the base 1 due to the rough edge or deformation, so that the second connection portion 32 of the lens ring 3 and the first connection portion 111 of the base 1 can have a greater tolerance for the design and manufacture to reduce the manufacturing cost, and the lens ring 3 and the base 1 will not be operated too loosely.

While the invention has been described by means of specific embodiments, numerous modifications and variations could be made thereto by those skilled in the art without departing from the scope and spirit of the invention set forth in the claims.

What is claimed is:

1. A casing of a webcam, comprising:
   a base, having a sheath hole, and the sheath hole having a first connection portion;
   a lens ring, with an upper side disposed around a first ring-shaped flange, and having a second connection portion disposed between an upper side and a lower side of the lens ring, and around a second ring-shaped flange, and the first ring-shaped flange being abutted against of an upper side of the sheath hole, and the second ring-shaped flange being abutted against a lower side of the first connection portion, wherein the sheath hole is formed between the first ring-shaped flange and the second ring-shaped flange of the lens ring, and wherein the sheath hole isolates the first ring-shaped flange and the second ring-shaped flange; and
   a flexible ring, clamped between the first connection portion and the second connection portion, and disposed between the first ring-shaped flange and the second ring-shaped flange.

2. The casing of a webcam as recited in claim 1, wherein the first connection portion is a first ring slot, and the second connection portion is a second ring slot.

3. The casing of a webcam as recited in claim 2, wherein the sheath hole includes a passage for passing the first connection portion, and a stop block disposed at a lower side of the first connection portion, and the lens ring includes a guide pillar disposed around the lens ring and at a lower side of the first connection portion, and the passage is provided for passing the guide pillar, and the stop block is provided for blocking the guide pillar.

4. The casing of a webcam as recited in claim 1, further comprising a plurality of doors, each having a penetrating hole formed on a side of the door, and a coupling slot formed on another side of the door, and a plurality of protruding pillars being formed at the lower side of the lens ring, and a plurality of flanges formed in the base and the protruding pillars being disposed at the penetrating holes respectively, and the coupling slots being disposed against the flanges.

5. The casing of a webcam as recited in claim 2, further comprising a plurality of doors, each having a penetrating hole formed on a side of the door, and a coupling slot formed on another side of the door, and a plurality of protruding pillars being disposed at the lower side of the lens ring, and a plurality of flanges being disposed in the base, and the protruding pillars being disposed at the penetrating holes respectively, and the coupling slots being disposed against the flanges.

6. The casing of a webcam as recited in claim 3, further comprising a plurality of doors, each having a penetrating hole formed on a side of the door, and a coupling slot formed on another side of the door, and a plurality of protruding pillars being disposed at the lower side of the lens ring, and a plurality of flanges being disposed in the base, and the protruding pillars being disposed at the penetrating holes respectively, and the coupling slots being disposed against the flanges.

7. The casing of a webcam as recited in claim 4, wherein the doors are engaged with each other on a substantially oblique side.

8. The casing of a webcam as recited in claim 5, wherein the doors are engaged with each other on a substantially oblique side.

9. The casing of a webcam as recited in claim 6, wherein the doors are engaged with each other on a substantially oblique side.

10. The casing of a webcam as recited in claims 1, wherein the base includes a pivot portion formed separately on both sides of the base.

11. The casing of a webcam as recited in claim 10, wherein the pivot portion is a pivot hole.

\* \* \* \* \*